(12) United States Patent
Davis

(10) Patent No.: US 12,513,119 B2
(45) Date of Patent: Dec. 30, 2025

(54) VIRTUAL PERSONAL MAILBOX SYSTEM AND METHOD

(71) Applicant: Robert Davis, Cape Coral, FL (US)

(72) Inventor: Robert Davis, Cape Coral, FL (US)

( * ) Notice: Subject to any disclaimer, the term of this patent is extended or adjusted under 35 U.S.C. 154(b) by 95 days.

(21) Appl. No.: 18/408,358

(22) Filed: Jan. 9, 2024

(65) Prior Publication Data

US 2025/0227092 A1  Jul. 10, 2025

(51) Int. Cl.
*H04L 9/40* (2022.01)

(52) U.S. Cl.
CPC ............... *H04L 63/0407* (2013.01)

(58) Field of Classification Search
CPC ........................................... H04L 63/04
See application file for complete search history.

(56) References Cited

U.S. PATENT DOCUMENTS

| | | | | |
|---|---|---|---|---|
| 7,853,481 B1 * | 12/2010 | Johnson | ............. | G06Q 30/0615 705/26.42 |
| 9,582,802 B2 * | 2/2017 | Bachenheimer | ..... | G06Q 10/107 |
| 10,936,504 B2 | 3/2021 | Parker et al. | | |
| 11,184,312 B1 * | 11/2021 | Yoskowitz | ............. | H04L 51/48 |
| 11,483,315 B2 | 10/2022 | Ge | | |
| 2005/0114453 A1 * | 5/2005 | Hardt | .................... | H04L 51/212 709/206 |
| 2005/0204011 A1 * | 9/2005 | Velayudham | ....... | H04L 61/4555 707/999.107 |
| 2006/0026438 A1 * | 2/2006 | Stern | ...................... | H04L 51/48 715/752 |
| 2006/0178994 A1 * | 8/2006 | Stolfo | .................... | G06Q 10/08 705/50 |
| 2008/0052364 A1 * | 2/2008 | Zhou | ..................... | H04L 61/301 709/206 |
| 2014/0373106 A1 * | 12/2014 | Morgenroth | .......... | H04L 51/212 726/4 |
| 2019/0311325 A1 * | 10/2019 | Reblin | .............. | G06Q 10/0836 |
| 2022/0279050 A1 | 9/2022 | Zmijewski et al. | | |
| 2023/0038570 A1 | 2/2023 | Flick et al. | | |
| 2023/0094317 A1 | 3/2023 | Kartoun et al. | | |

OTHER PUBLICATIONS

Abe et al., "Spam Filtering with Cryptographic Ad-hoc E-mail Addresses", Jan. 2005, Symposium on Applications and the Internet Workshops, pp. 114-117 (Year: 2005).*
International Search Report/Written Opinion dated Mar. 7, 2025 in related/corresponding PCT Application No. PCT/US2025/010253.

* cited by examiner

*Primary Examiner* — Kenneth W Chang
(74) *Attorney, Agent, or Firm* — PATENT PORTFOLIO BUILDERS PLLC

(57) ABSTRACT

A system includes a memory storing computer-readable instructions, and at least one processor to execute the instructions to receive an alias for a user, the alias representing a particular person, transmit a request to a server computing device, the request comprising a representation of the alias, query at least one database using the representation of the alias to determine a realtime physical address for the particular person, receive a response from the server computing device, the response comprising an encrypted representation of the realtime physical address for the particular person, and decrypt the realtime physical address for the particular person by the server computing device and send at least one object to the realtime physical address for the particular person.

19 Claims, 6 Drawing Sheets

123 HOME ADDRESS ROAD FAKE CITY, FL 12345
TIME ONE us.robertdavis@home

456 NICE TOWN AVENUE COLD CITY, IL 54321
TIME TWO us.robertdavis@home

VIRTUAL PERSONAL MAILBOX SYSTEM AND METHOD

BACKGROUND

Conventional approaches to changing a physical address are not suitable for a number of situations. In some cases, a person may live in more than one location either temporarily or may live in more than one location at a time and may have to update their address when they relocate, which is difficult. In other situations, it is not desirable to share a physical address due to concerns with safety or cyberstalking.

It is with these issues in mind, among others, that various aspects of the disclosure were conceived.

SUMMARY

According to one aspect, a virtual personal mailbox system and method is provided to allow users to generate an alias that can be provided to allow mail and parcels to be addressed to a user or person rather than a physical location. As an example, a user can use the virtual personal mailbox system to create a virtual personal mailbox, for example:

[schema]. [domain]. [handle] @ [location]

In other words, the virtual personal mailbox may be associated with an alias such as us.robertdavis@home==>123 Home Address Road, Fake City, FL 12345.

In one example, a system may include a memory storing computer-readable instructions, and at least one processor to execute the instructions to receive an alias for a user, the alias representing a particular person, transmit a request to a server computing device, the request comprising a representation of the alias, query at least one database using the representation of the alias to determine a realtime physical address for the particular person, receive a response from the server computing device, the response comprising an encrypted representation of the realtime physical address for the particular person, and decrypt the realtime physical address for the particular person by the server computing device and send at least one object to the realtime physical address for the particular person.

In another example, a method may include receiving, by the at least one processor, an alias for a user, the alias representing a particular person, transmitting, by the at least one processor, a request to a server computing device, the request comprising a representation of the alias, querying, by the at least one processor, at least one database using the representation of the alias to determine a realtime physical address for the particular person, receiving, by the at least one processor, a response from the server computing device, the response comprising an encrypted representation of the realtime physical address for the particular person, and decrypting, by the at least one processor, the realtime physical address for the particular person by the server computing device and sending at least one object to the realtime physical address for the particular person.

In another example, a non-transitory computer-readable storage medium may have instructions stored thereon that, when executed by at least one computing device cause the computing device to perform operations, the operations including receiving an alias for a user, the alias representing a particular person, transmitting a request to a server computing device, the request comprising a representation of the alias, querying at least one database using the representation of the alias to determine a realtime physical address for the particular person, receiving a response from the server computing device, the response comprising an encrypted representation of the realtime physical address for the particular person, and decrypting the realtime physical address for the particular person by the server computing device and sending at least one object to the realtime physical address for the particular person.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
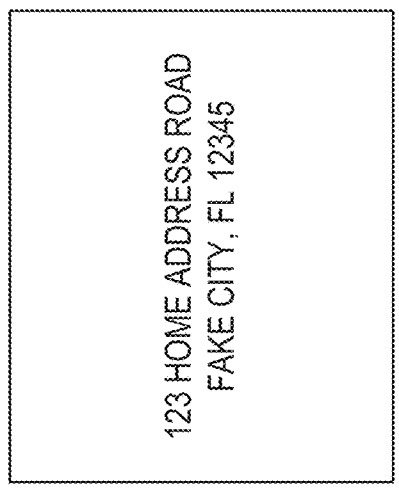
FIG. 1 is a diagram of a virtual personal mailbox according to an example of the instant disclosure.
Figure 1:
Figure 1:
Figure 1:
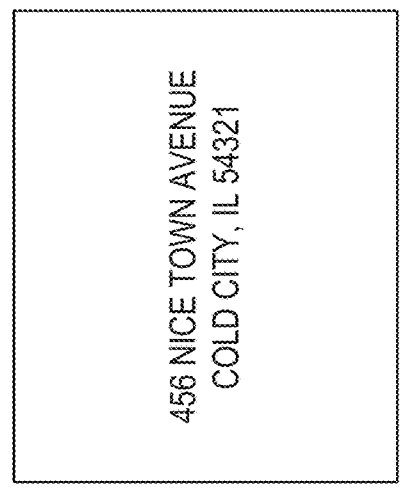
Figure 1:
Figure 1:
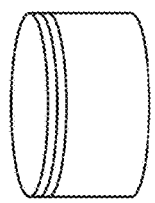

The present disclosure is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present disclosure, as the disclosure encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

A virtual personal mailbox system is discussed herein that allows users to generate an alias that can be provided to allow mail and parcels to be addressed to a user or person rather than a physical location. As an example, a user can use the virtual personal mailbox system to create a virtual personal mailbox.

A virtual personal mailbox system may include at least one server computing device providing a centralized software service that allows users to give customized aliases to their physical addresses to allow mail and parcels to be addressed to them rather than to their physical location. The mailbox owner may use the virtual personal mailbox system to create a virtual personal mailbox, for example:

[schema].[domain].[handle]@[location]

In other words, the virtual personal mailbox may be associated with an alias such as us.robertdavis@home==>123 Home Address Road, Fake City, FL 12345.

The schema includes information about country but also intended use of the alias. us is for United States addresses decrypted by couriers. But us-public can be queried by anybody.

The domain can be a way of grouping aliases. The default domain is 'personal', for regular consumer usage. The personal domain can be omitted. Other values for domain may be for commercial use. For example, BigCorp might use the bigcorp domain and create an alias such as us.bigcorp.john-smith@office.

The handle part of the alias may represent a particular person. It is unique per domain.

The location can be a user-specified string representing a particular location to receive mail or parcels. One location may be designated as the default. The default may be omitted.

Thus, as an example, us.personal.robert-davis@home might be shortened to us.robert-davis if the @home part is the default.

This mailbox information may be stored in one or more database tables. As an example, a mailbox owner and user may order or purchase an item from an internet storefront, sign up for a bank account, etc., and instead of providing their home address, may provide a seller their virtual personal mailbox address (ex: us.robertdavis@home).

When the seller wants to send mail or a parcel to the virtual personal mailbox, the seller may provide the post office or commercial courier service with the virtual personal mailbox address as the destination address. The courier service may then use the virtual personal mailbox system, to lookup and determine the physical destination to deliver the item and determine a physical address so that the item can be delivered.

Example Use Cases

Bob has pre-ordered several board games via an online crowdfunding website.

During the months between pre-order and fulfillment, Bob gets hit by a hurricane and needs to move around between several addresses in a short period of time. Bob updates the physical address associated with the virtual personal mailbox and each seller automatically has the correct address without having to update their own records.

Ann is an online influencer whose fans want to send fanmail to her. She wants to allow them but is concerned about giving her personal address out because she is worried about stalkers. She creates a virtual personal mailbox to give to her fans so they cannot look up the physical address.

Charles and Diana are a retired Massachusetts couple who live in Hawaii during the winter months. Before traveling each year, they update their virtual personal mailbox and now all their mail automatically transfers to their winter address.

As an example, the virtual personal mailbox system may be used by internet storefronts, particularly ones that may specialize in pre-orders that may be delivered at a later time because the virtual personal mailbox system may simplify changes in address.

As an example, the virtual personal mailbox system may be used by users with multiple homes or users that may frequently move because the user can provide a single piece of information and interested parties may automatically deliver goods to the user.

As an example, the virtual personal mailbox system may be used by small internet storefronts or person-to-person internet sales where one or more parties may be concerned or worried about cyberstalking. Unlike a traditional post office box, the virtual personal mailbox system allows the user to access from a computing device and is able to easily change an associated physical address in realtime.

In one example, a system may include a memory storing computer-readable instructions, and at least one processor to execute the instructions to receive an alias for a user, the alias representing a particular person, transmit a request to a server computing device, the request comprising a representation of the alias, query at least one database using the representation of the alias to determine a realtime physical address for the particular person, receive a response from the server computing device, the response comprising an encrypted representation of the realtime physical address for the particular person, and decrypt the realtime physical address for the particular person by the server computing device and send at least one object to the realtime physical address for the particular person.

FIG. 1 is a diagram of a virtual personal mailbox 100 according to an example of the instant disclosure. As shown in FIG. 1, a user may create an alias that may be stored in at least one database. The alias may be us.robertdavis@home and the at least one database may be queried to determine a realtime physical address for a user or person such as 123 Home Address Road Fake City, FL 12345. In many situations, it is desirable to provide the alias rather than provide a physical address because a user may have a physical address that is different at different times of the year or even changes by the day. As an example, a person may live in a first home for a first period of time, move to a second home for a second period of time, and move to the first home for a third period of time. The user can update their address by providing information to a server computing device. The server computing device may receive a request for the realtime or current address of the user by receiving an alias for the user and the server computing device may provide a representation of the realtime or current address. Alternatively, the server computing device may use the representation of the realtime or current address and may send mail or a parcel to the realtime or current address without allowing another person other than the user to view the realtime or current address. In many situations, a user may not want to provide their physical address because of issues associated with security and cyberstalking.

As an example, a user may live at a first address from January to March such as 123 Home Address Road Fake City, FL 12345.

The user may live at a second address from March to July such as 456 Nice Town Avenue Cold City, IL 54321.

The user may vacation at a third address from August to September such as 789 Island Boulevard Warm Island, HI 98765 and then move back to the second address from October to December.

Rather than updating an address with a number of parties that may need the updated address, the user only has to provide the alias and the alias provides a representation of the realtime physical address for the user. As an example, when the address for the user is requested, the server computing device may receive the alias and send the representation of the realtime physical address for the user.

Figure 2:
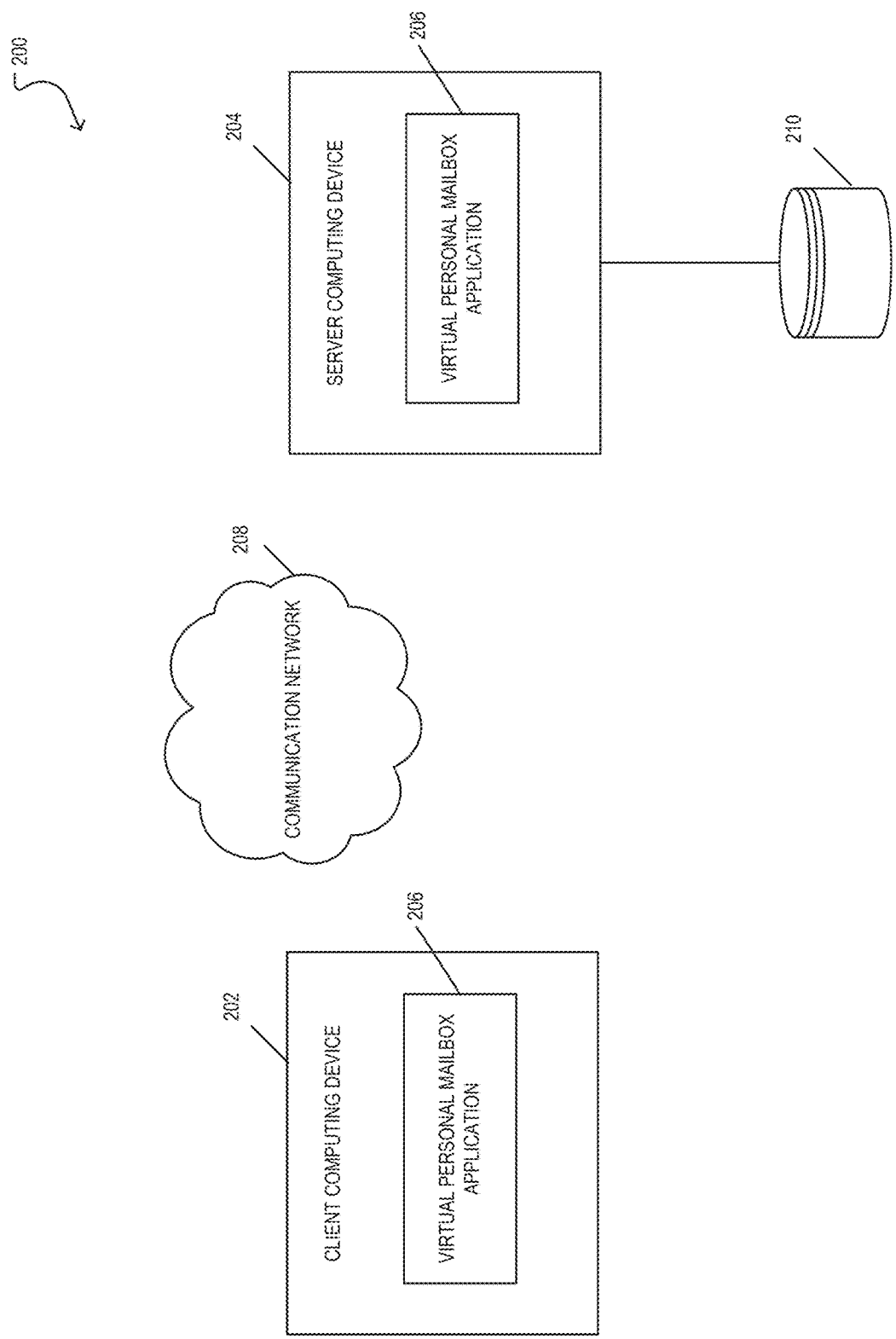
FIG. 2 is a block diagram of a virtual personal mailbox system according to an example of the instant disclosure.

FIG. 2 is a block diagram of a virtual personal mailbox system 200 according to an example of the instant disclosure. As shown in FIG. 2, the system 200 may include at least one client computing device 202 and at least one server computing device 204. The at least one server computing device 204 may be in communication with at least one database 210.

The at least one client computing device 202 and the at least one server computing device 204 may be configured to receive data from and/or transmit data through a communication network 208. Although the at least one client computing device 202 and the at least one server computing device 204 are shown as a single computing device, it is contemplated each computing device may include multiple computing devices.

The communication network 208 can be the Internet, an intranet, or another wired or wireless communication network. For example, the communication network 208 may include a Mobile Communications (GSM) network, a code division multiple access (CDMA) network, 3rd Generation Partnership Project (GPP) network, an Internet Protocol (IP) network, a wireless application protocol (WAP) network, a WiFi network, a Bluetooth network, a near field communication (NFC) network, a satellite communications network, or an IEEE 802.11 standards network, as well as various communications thereof. Other conventional and/or later developed wired and wireless networks may also be used.

The client computing device 202 and the server computing device 204 may have a virtual personal mailbox application 206 that may be a component of an application and/or service executable by the at least one client computing device 202 and/or the at least one server computing device 204. For example, the virtual personal mailbox application 206 may be a single unit of deployable executable code or a plurality of units of deployable executable code. According to one aspect, the virtual personal mailbox application 206 may include one component that may be a web application, a native application, and/or an application (e.g., an app) downloaded from a digital distribution application platform that allows users to browse and download applications developed with software development kits (SDKs) including the APPLE® iOS App Store and GOOGLE PLAY®, among others.

The virtual personal mailbox system 200 also may include one or more data sources that store and communicate data from at least one database 210. As an example, the data stored in the at least one database 210 may be virtual personal mailbox information such as one or more database tables that may include address information for a plurality of users such as a unique alias and a physical address associated with each unique alias that may be updated by a user or may change based on a current time.

The client computing device 202 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 202 further includes at least one communications interface to transmit and receive communications, messages, and/or signals.

The client computing device 202 could be a programmable logic controller, a programmable controller, a laptop computer, a smartphone, a personal digital assistant, a tablet computer, a standard personal computer, or another processing device. The client computing device 202 may include a display, such as a computer monitor, for displaying data and/or graphical user interfaces. The client computing device 202 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 204 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 204 further includes at least one communications interface to transmit and receive communications, messages, and/or signals.

As an example, the client computing device 202 communicates data in packets, messages, or other communications using a common protocol, e.g., Hypertext Transfer Protocol (HTTP) and/or Hypertext Transfer Protocol Secure (HTTPS). The one or more computing devices may communicate based on representational state transfer (REST) and/or Simple Object Access Protocol (SOAP). As an example, a first computer (e.g., the client computing device 202) may send a request message that is a REST and/or a SOAP request formatted using JavaScript Object Notation (JSON) and/or Extensible Markup Language (XML). In response to the request message, a second computer (e.g., the server computing device 204) may transmit a REST and/or SOAP response formatted using JSON and/or XML.

In one example, the server computing device 204 is located on premises at a location. As another example, the server computing device 204 comprises a cloud computing device. In some examples, there may be at least one server computing device 204 located on premises and a cloud computing device.

Figure 3:
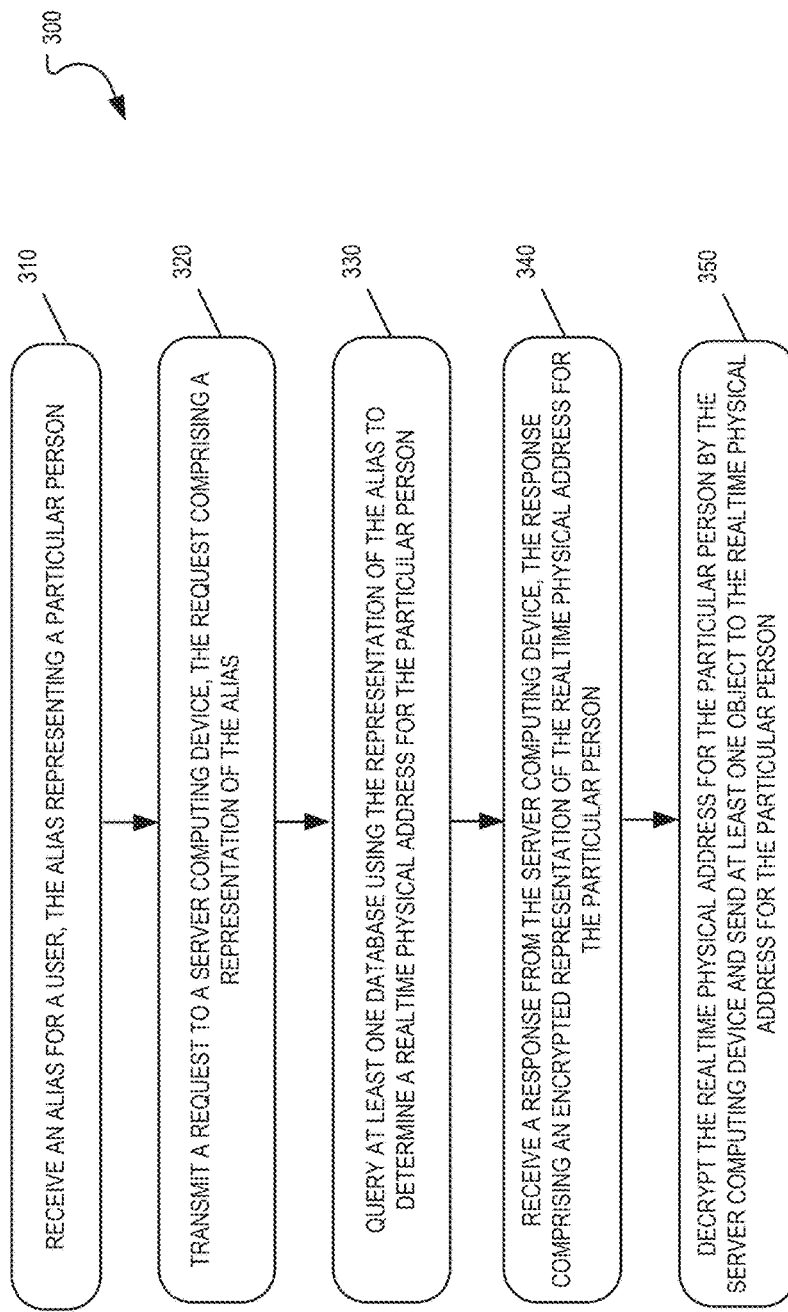
FIG. 3 is a flowchart of a process for determining a realtime physical address according to an example of the instant disclosure.

FIG. 3 illustrates an example method 300 for determining an address by the virtual personal mailbox system 200 according to an example of the instant disclosure. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes receiving an alias for a user, the alias representing a particular person at block 310. As an example, the alias may include a string value such as the following [schema]. [domain]. [handle] @ [location].

The schema includes information about country but also intended use of the alias. us is for United States addresses decrypted by couriers. But us-public can be queried by anybody.

The domain can be a way of grouping aliases. The default domain is 'personal', for regular consumer usage. The personal domain can be omitted. Other values for domain may be for commercial use. For example, BigCorp might use the bigcorp domain and create an alias such as us.bigcorp.john-smith@office.

The handle part of the alias may represent a particular person. It is unique per domain.

The location can be a user-specified string representing a particular location to receive mail or parcels. One location may be designated as the default. The default may be omitted.

Thus, as an example, us.personal.robert-davis@home might be shortened to us.robert-davis if the @home part is the default.

In other words, the alias may be a string value such as a first component including the schema that includes information about a country, a second component including the domain having information about a grouping of the alias, a third component having the handle representing the particular person, and a fourth component having the location associated with the realtime physical address.

According to some examples, the method 300 includes transmitting a request to the server computing device 204 at block 320. The request may include a representation of the alias.

According to some examples, the method 300 includes querying the at least one database 210 using the representation of the alias to determine a realtime physical address for the particular person at block 330.

According to some examples, the method 300 includes receiving a response from the server computing device 204 at block 340. The response can be an encrypted representation of the realtime physical address for the particular person.

According to some examples, the method 300 includes decrypting the realtime physical address for the particular person by the server computing device 204 and sending at least one object such as an envelope, parcel, or other package to the realtime physical address for the particular person at block 350. The realtime physical address may include name information, address line one information, address line two information, city information, state information, and postal code information for the user, among other information.

According to some examples, the method 300 may include receiving at least one physical address for the user and storing the at least one physical address for the user in the database 210 associated with the alias.

According to some examples, the method 300 may include receiving a change in the realtime physical address for the user to be selected from the at least one physical address for the user.

According to some examples, the method 300 may include transmitting the request as a web application programming interface (API) request to the server computing device 204.

According to some examples, the method 300 may include preventing a party from viewing the realtime physical address of the particular person.

According to some examples, the method 300 may include receiving a future time and determining a future physical address at the future time for the user based on the alias. In another example, the method 300 may include receiving a time such as a time in the past and determining the physical address of the particular person at the time in the past.

According to some examples, the method 300 may include receiving a request for a list of historical physical addresses for the user and determining the list of historical physical addresses for the user based on the alias.

According to some examples, the method 300 may include receiving confirmation of payment for the at least one object and sending an encrypted representation of the physical address for the particular person to a payment processing server computing device.

Figure 4:
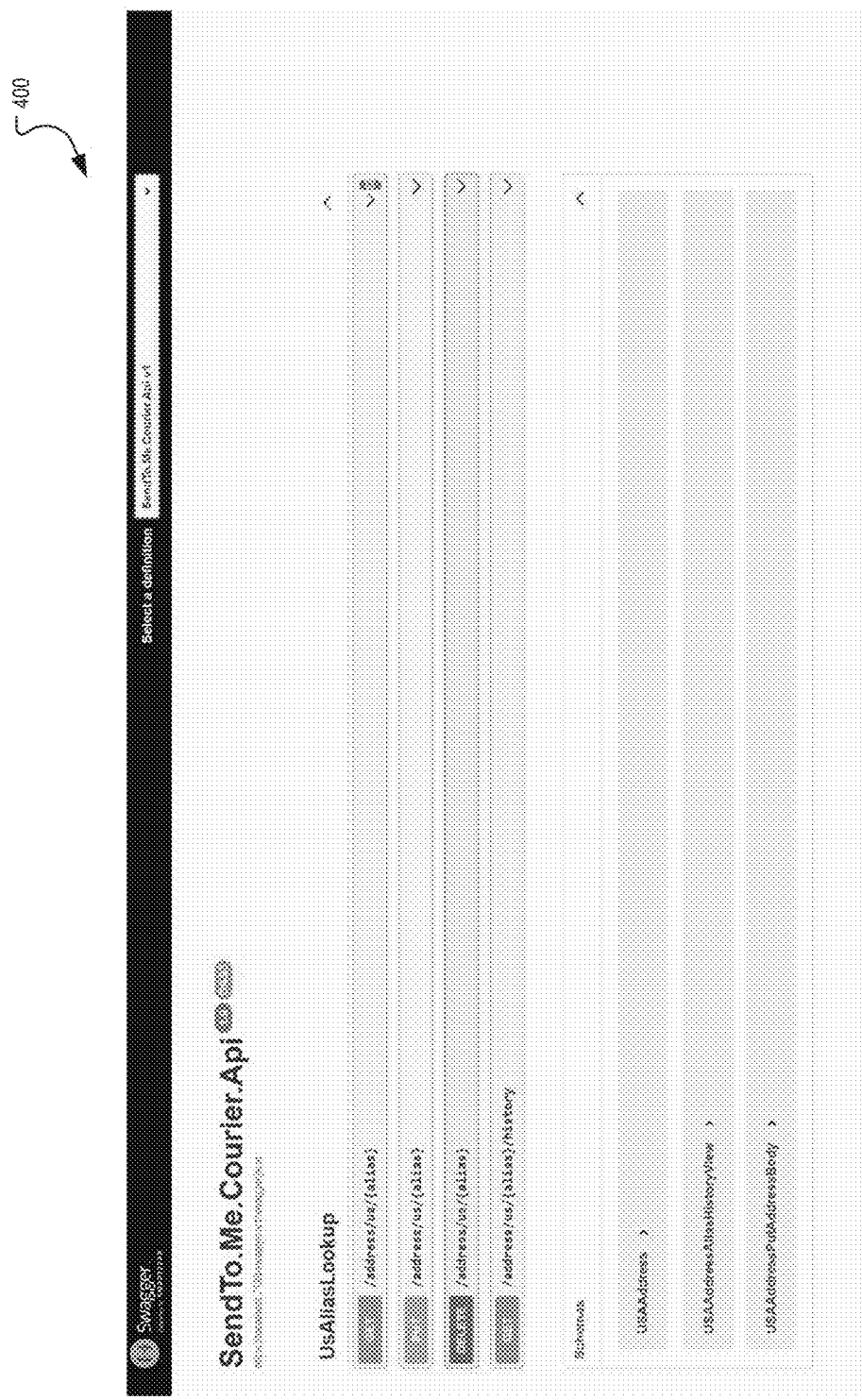
FIG. 4 shows a screenshot of a web application programming interface (API) associated with the virtual personal mailbox system according to an example of the instant disclosure.

FIG. 4 shows a screenshot 400 of a web application programming interface (API) associated with the virtual personal mailbox system 200 according to an example of the instant disclosure. In one example, the web API associated with the virtual personal mailbox system 200 may be associated with OpenAPI Specifications (OAS).

As shown in FIG. 4, the web API may be associated with an API that may be known as SendTo.Me.Courier.api and may have functions such as USAliasLookUp that may be associated with a GET request that may include an alias, a PUT request that may include an alias, a DELETE request that may include an alias, and a GET request to obtain history information associated with an alias. Additionally, there may be schemas that provide detailed information about properties of a resource including USAAddress, USAAddressAliasHistory View, and USAAddressPutAddressBody, among others. In one example, each scheme can be represented by a dictionary. Keys of the dictionary are names of resource property values that can be objects that are associated with and describe the corresponding property.

Figure 5:
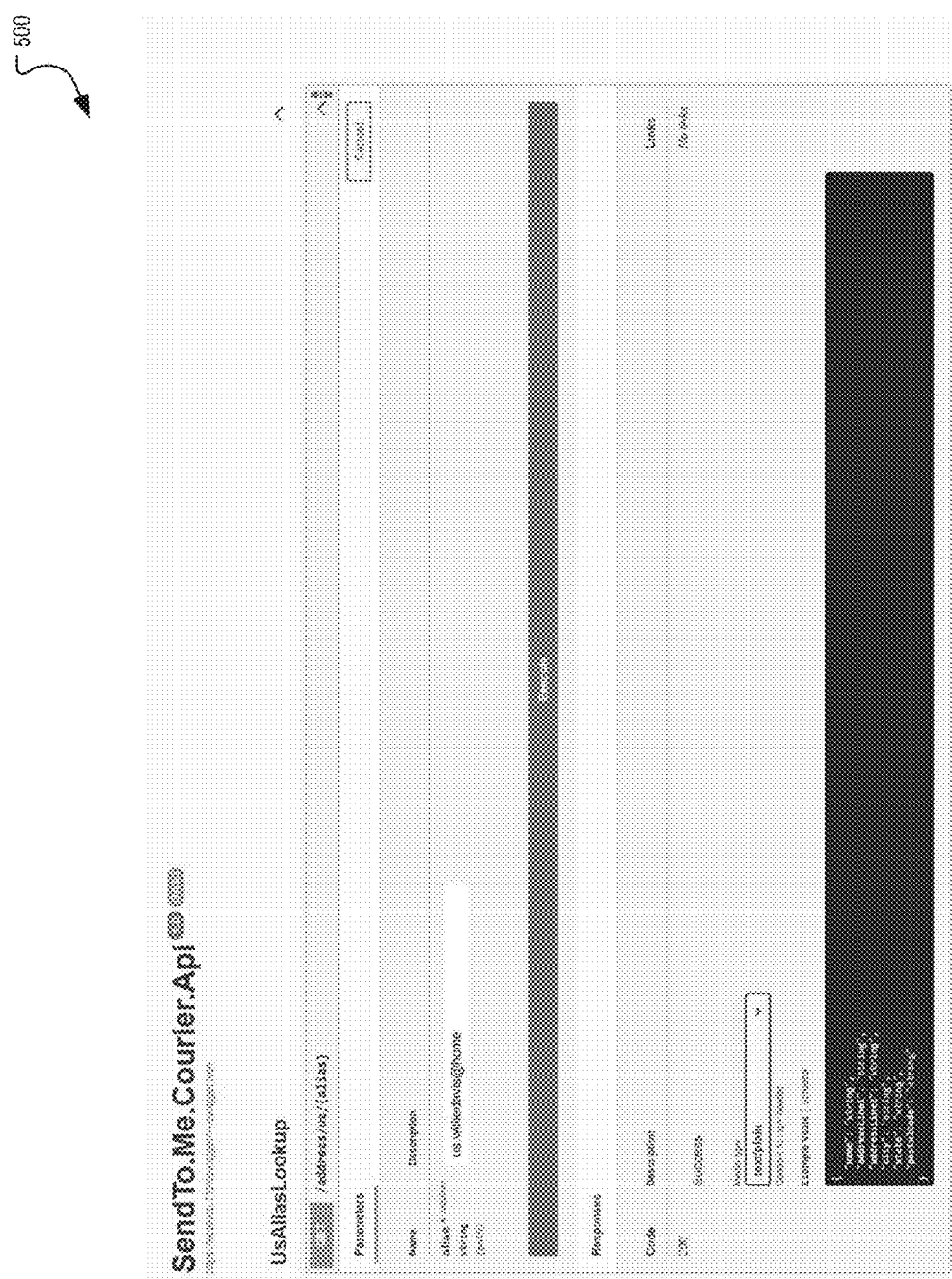
FIG. 5 shows another screenshot of a web API associated with the virtual personal mailbox system according to an example of the instant disclosure.

FIG. 5 shows another screenshot 500 of a web API associated with the virtual personal mailbox system according to an example of the instant disclosure. As shown in FIG. 5, the web API may include an alias lookup request that may include an alias that may be a string value. An example response to the request may include name information that may be a string value, addressLine1 information that may be a string value, addressLine2 information that may be a string value, city information that may be a string value, state information that may be a string value, and postalCode information that may be a string value, among other things.

As shown in FIG. 5, a user can test and execute the UsAliasLookup by providing a value such as a string value that may be us.williedavis@home and selecting a user interface element that may execute the GET request that may obtain a response that may have an example value such as the schema shown in FIG. 5.

Figure 6:
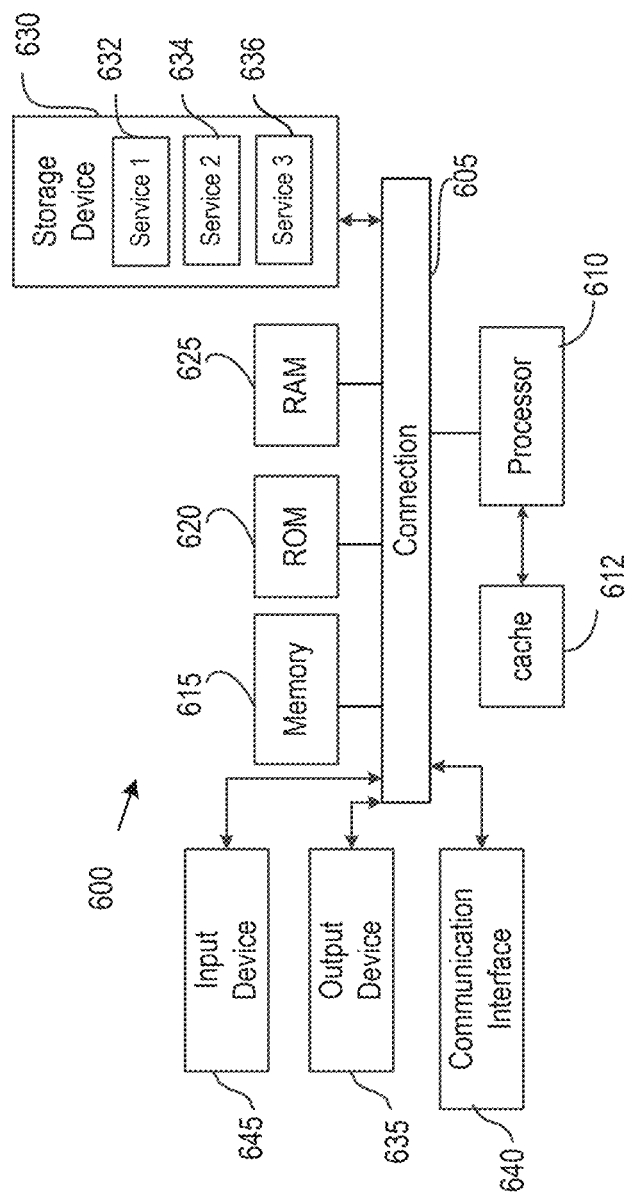
FIG. 6 shows an example of a system for implementing certain aspects of the present technology.

FIG. 6 shows an example of computing system 600, which can be, for example, the client computing device 202, the server computing device 204, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative Examples of the Disclosure Include

Aspect 1: A system comprising a memory storing computer-readable instructions, and at least one processor to execute the instructions to receive an alias for a user, the alias representing a particular person, transmit a request to a server computing device, the request comprising a representation of the alias, query at least one database using the representation of the alias to determine a realtime physical address for the particular person, receive a response from the server computing device, the response comprising an encrypted representation of the realtime physical address for the particular person, and decrypt the realtime physical address for the particular person by the server computing device and send at least one object to the realtime physical address for the particular person.

Aspect 2: The system of Aspect 1, the at least one processor further to receive at least one physical address for the user and store the at least one physical address for the user in the database associated with the alias.

Aspect 3: The system of Aspects 1 and 2, the at least one processor further to receive a change in the realtime physical address for the user to be selected from the at least one physical address for the user.

Aspect 4: The system of Aspects 1 to 3, the at least one processor further to transmit the request as a web application programming interface (API) request to the server computing device.

Aspect 5: The system of Aspects 1 to 4, wherein the realtime physical address comprises name information, address line one information, address line two information, city information, state information, and postal code information for the user.

Aspect 6: The system of Aspects 1 to 5, wherein the alias comprises a string value comprising [schema].[domain].[handle] @ [location].

Aspect 7: The system of Aspects 1 to 6, wherein the alias comprises a first component comprising the schema that includes information about a country, a second component comprising the domain comprising information about a grouping of the alias, a third component comprising the handle representing the particular person, and a fourth component representing the location associated with the realtime physical address.

Aspect 8: The system of Aspects 1 to 7, the at least one processor further to prevent a party from viewing the realtime physical address of the particular person.

Aspect 9: The system of Aspects 1 to 8, the at least one processor further to receive a future time and determine a future physical address at the future time for the user based on the alias.

Aspect 10: The system of Aspects 1 to 9, the at least one processor further to receive confirmation of payment for the at least one object and send an encrypted representation of the physical address for the particular person to a payment processing server computing device.

Aspect 11: A method comprising receiving, by the at least one processor, an alias for a user, the alias representing a particular person, transmitting, by the at least one processor, a request to a server computing device, the request comprising a representation of the alias, querying, by the at least one processor, at least one database using the representation of the alias to determine a realtime physical address for the particular person, receiving, by the at least one processor, a response from the server computing device, the response comprising an encrypted representation of the realtime physical address for the particular person, and decrypting, by the at least one processor, the realtime physical address for the particular person by the server computing device and sending at least one object to the realtime physical address for the particular person.

Aspect 12: The method of Aspect 11, further comprising receiving at least one physical address for the user and storing the at least one physical address for the user in the database associated with the alias.

Aspect 13: The method of Aspects 11 and 12, further comprising receiving a change in the realtime physical address for the user to be selected from the at least one physical address for the user.

Aspect 14: The method of Aspects 11 to 13, further comprising transmitting the request as a web application programming interface (API) request to the server computing device.

Aspect 15: The method of Aspects 11 to 14, wherein the realtime physical address comprises name information, address line one information, address line two information, city information, state information, and postal code information for the user.

Aspect 16: The method of Aspects 11 to 15, wherein the alias comprises a string value having a first component comprising [schema]. [domain]. [handle] @ [location].

Aspect 17: The method of Aspects 11 to 16, wherein the alias comprises a first component comprising the schema that includes information about a country, a second component comprising the domain comprising information about a grouping of the alias, a third component comprising the handle representing the particular person, and a fourth component representing the location associated with the realtime physical address.

Aspect 18: The method of Aspects 11 to 17, further comprising preventing a party from viewing the realtime physical address of the particular person.

Aspect 19: The method of Aspects 11 to 18, further comprising receiving a future time and determining a future physical address at the future time for the user based on the alias.

Aspect 20: The method of Aspects 11 to 19, further comprising receiving confirmation of payment for the at least one object and sending an encrypted representation of the physical address for the particular person to a payment processing server computing device.

Aspect 21: A non-transitory computer-readable storage medium, having instructions stored thereon that, when executed by at least one computing device cause the at least one computing device to perform operations, the operations comprising receiving an alias for a user, the alias representing a particular person, transmitting a request to a server computing device, the request comprising a representation of the alias, querying at least one database using the representation of the alias to determine a realtime physical address for the particular person, receiving a response from the server computing device, the response comprising an encrypted representation of the realtime physical address for the particular person, and decrypting the realtime physical address for the particular person by the server computing device and sending at least one object to the realtime physical address for the particular person.

What is claimed is:

1. A system comprising:
   a memory storing computer-readable instructions; and
   at least one processor to execute the instructions to:
   receive an alias for a user, the alias representing a particular person, the alias comprising [schema][domain][handle]@[location];
   transmit a request to a server computing device, the request comprising a representation of the alias;
   query at least one database using the representation of the alias to determine a realtime physical address for the particular person;
   receive a response from the server computing device, the response comprising an encrypted representation of the realtime physical address for the particular person; and
   decrypt the realtime physical address for the particular person by the server computing device and send at least one object to the realtime physical address for the particular person.

2. The system of claim 1, the at least one processor further to receive at least one physical address for the user and store the at least one physical address for the user in the database associated with the alias.

3. The system of claim 2, the at least one processor further to receive a change in the realtime physical address for the user to be selected from the at least one physical address for the user.

4. The system of claim 1, the at least one processor further to transmit the request as a web application programming interface (API) request to the server computing device.

5. The system of claim 4, wherein the realtime physical address comprises name information, address line one information, address line two information, city information, state information, and postal code information for the user.

6. The system of claim 1, wherein the alias comprises a first component comprising the schema that includes information about a country, a second component comprising the domain comprising information about a grouping of the alias, a third component comprising the handle representing the particular person, and a fourth component representing the location associated with the realtime physical address.

7. The system of claim 1, the at least one processor further to prevent a party from viewing the realtime physical address of the particular person.

8. The system of claim 1, the at least one processor further to receive a future time and determine a future physical address at the future time for the user based on the alias.

9. The system of claim 1, the at least one processor further to receive confirmation of payment for the at least one object and send an encrypted representation of the physical address for the particular person to a payment processing server computing device.

10. A method, comprising:
    receiving, by at least one processor, an alias for a user, the alias representing a particular person, the alias comprising [schema][domain][handle]@[location];
    transmitting, by the at least one processor, a request to a server computing device, the request comprising a representation of the alias;
    querying, by the at least one processor, at least one database using the representation of the alias to determine a realtime physical address for the particular person;
    receiving, by the at least one processor, a response from the server computing device, the response comprising an encrypted representation of the realtime physical address for the particular person; and
    decrypting, by the at least one processor, the realtime physical address for the particular person by the server computing device and sending at least one object to the realtime physical address for the particular person.

11. The method of claim 10, further comprising receiving at least one physical address for the user and storing the at least one physical address for the user in the database associated with the alias.

12. The method of claim 11, further comprising receiving a change in the realtime physical address for the user to be selected from the at least one physical address for the user.

13. The method of claim 10, further comprising transmitting the request as a web application programming interface (API) request to the server computing device.

14. The method of claim 13, wherein the realtime physical address comprises name information, address line one information, address line two information, city information, state information, and postal code information for the user.

15. The method of claim 10, wherein the alias comprises a first component comprising the schema that includes information about a country, a second component comprising the domain comprising information about a grouping of the alias, a third component comprising the handle representing the particular person, and a fourth component representing the location associated with the realtime physical address.

16. The method of claim 10, further comprising preventing a party from viewing the realtime physical address of the particular person.

17. The method of claim 10, further comprising receiving a future time and determining a future physical address at the future time for the user based on the alias.

18. The method of claim 10, further comprising receiving confirmation of payment for the at least one object and sending an encrypted representation of the physical address for the particular person to a payment processing server computing device.

19. A non-transitory computer-readable storage medium, having instructions stored thereon that, when executed by at least one computing device cause the at least one computing device to perform operations, the operations comprising:

receiving an alias for a user, the alias representing a particular person, the alias comprising [schema][domain][handle]@[location];

transmitting a request to a server computing device, the request comprising a representation of the alias;

querying at least one database using the representation of the alias to determine a realtime physical address for the particular person;

receiving a response from the server computing device, the response comprising an encrypted representation of the realtime physical address for the particular person; and decrypting the realtime physical address for the particular person by the server computing device and sending at least one object to the realtime physical address for the particular person.

* * * * *